(12) United States Patent
Arnoldo et al.

(10) Patent No.: US 9,783,014 B2
(45) Date of Patent: Oct. 10, 2017

(54) DEVICE FOR MEASURING THE TIRE PRESSURE IN A PNEUMATIC TIRE OF A VEHICLE

(71) Applicant: Huf Hülsbeck & Fürst GmbH & Co. KG, Velbert (DE)

(72) Inventors: Sven Arnoldo, Malsch (DE); Ralf Kessler, Pfintzal (DE); Andre Seifert, Pforzheim (DE)

(73) Assignee: HUF HÜLSBECK & FÜRST GMBH & CO. KG, Velbert (DE)

( * ) Notice: Subject to any disclaimer, the term of this patent is extended or adjusted under 35 U.S.C. 154(b) by 312 days.

(21) Appl. No.: 14/659,410

(22) Filed: Mar. 16, 2015

(65) Prior Publication Data

US 2015/0210126 A1 Jul. 30, 2015

Related U.S. Application Data

(63) Continuation of application No. PCT/EP2013/068723, filed on Sep. 10, 2013.

(51) Int. Cl.
*B60C 23/04* (2006.01)
*G01L 17/00* (2006.01)

(52) U.S. Cl.
CPC ...... *B60C 23/0498* (2013.01); *B60C 23/0491* (2013.01); *B60C 23/0494* (2013.01); *G01L 17/005* (2013.01)

(58) Field of Classification Search
CPC .................................................. B60C 23/0498
See application file for complete search history.

(56) References Cited

U.S. PATENT DOCUMENTS

| | | | |
|---|---|---|---|
| 7,040,155 B1 | 5/2006 | Lundell et al. | |
| 2003/0046994 A1* | 3/2003 | Luce | B60C 23/0494 73/146.8 |
| 2010/0024539 A1 | 2/2010 | Hamm et al. | |
| 2011/0219865 A1 | 9/2011 | Baum | |

FOREIGN PATENT DOCUMENTS

EP 1 386 759 A1 2/2004

* cited by examiner

*Primary Examiner* — Paul West
(74) *Attorney, Agent, or Firm* — Hackler Daghighian Martino & Novak

(57) ABSTRACT

A device for measuring the tire pressure in a wheel of a vehicle provided with a pneumatic tire is accommodated in a shell-shaped housing which is arranged at the valve base of a tire valve. Provision is made that there is only a single location on the housing by which the housing can rest on the rim well of a rim of the wheel.

13 Claims, 9 Drawing Sheets

DEVICE FOR MEASURING THE TIRE PRESSURE IN A PNEUMATIC TIRE OF A VEHICLE

CROSS-REFERENCE TO RELATED APPLICATIONS

This continuation application claims priority to PCT/EP2013/068723 filed on Sep. 10, 2013 which has published as WO 2014/044576 A1 and also the German application number 10 2012 108 884.5 filed on Sep. 20, 2012 and German application number 10 2012 112 056.0 filed on Dec. 11, 2012, the contents of which all applications are fully incorporated herein with these references.

FIELD OF THE INVENTION

The invention relates to a device for measuring the tire pressure in a pneumatic tire of a vehicle and to a wheel equipped with such a device.

BACKGROUND OF THE INVENTION

A prior art device and a wheel equipped therewith are known from EP 0 751 017 B1. The known device has a housing of a dimensionally stable plastic with an approximately cuboid base part and a centrally arranged extension, in which a cavity of calotte-like shape is formed, in which an elongated hole is situated. A tire valve has at its internally located end (subsequently designated as valve base) a calotte-shaped bulge, which fits into the calotte-shaped cavity, and a threaded bore, which continues into the valve bore necessary for filling the tire with compressed air. A hollow screw can be turned into the threaded bore through the elongated hole in the extension of the housing, by which hollow screw the housing is fastened to the valve base. By means of the elongated hole, the housing can be adjusted after the mounting of the valve on the wheel such that the housing rests on the rim well by its side facing the rim well of the wheel. To achieve that the housing receives a stable position of rest on the rim, two feet are provided on the two side parts of the housing remote from the valve, with the greatest possible distance from the valve base, which feet rest on the rim well. Together with the fastening of the housing on the valve base, thereby a statically clearly determined 3-point bearing is produced for the housing.

In the housing there are accommodated a pressure measuring device, a transmitting device for the transmission of the pressure measurement values by radio to a receiver provided in the vehicle, a control device and a battery for the electric power supply of the device. These components of the device are embedded into a casting compound, with which the shell-shaped housing is filled to the brim, with the feet of the housing, however, remaining free.

On mounting of a tire onto the rim and on removing a tire from the rim, it can occur that the device for measuring the air pressure is damaged. In such a case, the device must be completely replaced.

It is an object of the present invention to show a way where the risk of damage to the device for measuring the air pressure can be reduced, without substantially increasing the weight of the device.

SUMMARY OF THE INVENTION

This problems of the prior art are solved by a wheel having the features disclosed in the independent claims and in this disclosure. Advantageous further developments of the invention are the subject matter of the dependent claims.

The wheel, according to the invention, of a vehicle has a pneumatic tire and a device for measuring the tire pressure in the pneumatic tire, which device is accommodated in a shell-shaped housing. The housing is arranged at the end of a tire valve, the end of the tire valve lying in the wheel. This end is designated as valve base. After being mounted, as intended, on the wheel, the valve base lies in the interior between the pneumatic tire and a rim carrying it, which has a rim well and two shoulders delimiting the latter. One of the two shoulders has a hole in which the tire valve is inserted. The housing, fastened to the valve base, is arranged so that it rests on the rim well.

According to the invention, there is only a single location on the housing by which the housing rests on the rim well. Therefore, instead of a 3-point bearing known in the prior art, according to the invention only a 2-point bearing is realized.

Surprisingly, it has been found that with such a configuration, in which the device for measuring the tire pressure is merely supported at two points of the wheel, the device for measuring the tire pressure is less liable to damage on mounting a tire onto the rim and on removing a tire from the rim than a conventional device for measuring the tire pressure, which is supported at three points of the wheel. This is all the more surprising, since with the 2-point bearing provided according to the invention constitutes a statically indeterminate (unstable) bearing.

It is a particular advantage of the present invention that the risk of damage to the device for measuring the tire pressure on mounting a tire and on removing a tire from the rim can be achieved, without increasing the weight of the device. This is therefore an essential advantage, because each increase in the weight of the device would produce an additional imbalance of the wheel, which would have to be compensated by balancing the wheel.

Furthermore, the keeper of the vehicle saves significant costs, which he could incur because of a replacement of damaged devices for measuring the tire pressure, and workshop staff do not have to exercise caution beyond the normal extent when changing a tire.

The sole location of the housing by which the housing mounted on the tire valve can rest on the rim well can be situated at the edge of the housing, in particular on a part of the edge of the housing which faces away from the hole in the shoulder of the rim in which the tire valve is inserted. In this embodiment, the invention can be realized in a particularly simple manner. In addition, this further development of the invention has the advantage that a tire bead on mounting of a tire or on removing of a tire from the rim cannot slide over the edge, which surrounds the opening of the shell-shaped housing, but rather, if need be, slides over the very much more stable closed side of the shell-shaped housing.

The sole location by which the housing of the device for measuring the tire pressure can rest on the rim well does not have to be exactly localized. Rather, the possibility also exists that the housing, as a result of the 2-point bearing, rolls to a limited extent on the rim well by rotation about the longitudinal axis of the tire valve, whereby the location by which the housing rests on the rim well can travel slightly on the side of the housing facing the rim well, in particular along that part of the edge of the housing which faces away from the hole in the shoulder of the rim or from the valve base, respectively. Despite this possibility that the location by which the housing rests on the rim well can travel slightly, it remains in every case a 2-point bearing.

In an exemplary embodiment, the sole location by which the housing rests on the rim well is situated on a part of the edge of the housing, the surface of which facing the rim well, which surface is designated here as the end face, has a curvature which is smaller than the curvature of the rim well. In other words: The radius of curvature of the rim well, i.e. the distance from the rotation axis of the wheel to the upper side of the rim well, is smaller than the radius of curvature of the part, resting on the rim well, of the edge of the housing. Thereby, a three-point bearing of the device for measuring the tire pressure is ruled out.

In an exemplary embodiment, the surface, facing the rim well, of the part of the edge by which the housing rests on the rim well, is not curved at all, but is flat. This facilitates the construction of the housing and permits one and the same housing to be used for devices for measuring the tire pressure on rims having any desired diameter. Furthermore, it is also possible to provide the part of the edge of the housing by which the housing rests on the rim well with a curvature which has an opposed sign to the curvature of the rim, in which the curvature center point therefore lies on the side of the rim well facing away from the rotation axis of the wheel.

In an exemplary embodiment, the part of the edge of the housing by which the latter rests on the rim well lies on both sides of a plane in which both the rotation axis of the wheel and also the longitudinal axis of the tire valve lies. This enables a structure of the device for measuring the tire pressure, which is symmetrical or largely symmetrical to the longitudinal axis of the tire valve or to the plane in which both the rotation axis of the wheel and also the longitudinal axis of the tire valve lies. Such a symmetrical or almost symmetrical structure is favorable for receiving the centrifugal forces which, with a rotating wheel, act on the device for measuring the tire pressure and on its bearing.

The part of the edge of the housing by which the housing rests on the rim well may extends over no more than two thirds of the length, in particular over no more than half of the length of the entire edge of the housing. In an exemplary embodiment, this part of the edge is situated on the edge section which faces away from the hole in the shoulder of the rim in which the tire valve is placed, or respectively from the valve base. The remaining part of the edge is set back with respect to the part of the edge by which the housing rests on the rim well. The casting compound, which is filled into the housing to protect the electrical components of the device for measuring the tire pressure is expediently filled up to the set-back part of the edge of the housing. The other part of the edge, by which the housing can rest on the rim well, then projects beyond the surface of the casting compound.

The edge as a whole delimits and surrounds an opening of the shell-shaped housing. Through this opening, the circuitry parts of the device for measuring the tire pressure and a battery for their current supply can be inserted into the housing. Through this opening also a casting compound can be filled into the housing, in order to thereby fill up the remaining free space in the housing.

The part of the edge by which the housing rests on the rim well may have a greater wall thickness than wall sections of the housing adjacent to this part of the edge. The thickened edge is favorable, in order to absorb the stresses of the housing occurring on mounting a tire and on removing a tire, and to introduce them into the rim.

In an exemplary embodiment, the part of the wheel by which the housing rests on the rim well is rounded. This has the advantage that the edge of the housing, with different inclinations of the housing with respect to the tire valve fastened thereon, lies equally well on the rim well. Peak stresses at the edge of the housing can be avoided in this way.

In an exemplary embodiment, at least the part of the edge by which the housing rests on the rim well is coated in a friction-reducing manner. This prevents damage to the edge of the housing when the edge of the housing moves on the rim well as a result of changing mechanical loads.

The housing and the tire valve can be connected securely and unchangeably with one another. Expediently, however, the housing is arranged adjustably on the tire valve, in particular so that the inclination of the housing is changeable with respect to the longitudinal axis of the tire valve. This can be realized as is disclosed by EP 0 751 017 B1, by an extension being formed on the shell-shaped housing, in which extension a calotte-shaped recess with an elongated hole therein is situated, into which the valve base is inserted and fixed by a hollow screw, by the latter being turned in a threaded bore of the tire valve. For this, the valve base has a convex end which fits into the calotte-shaped recess of the housing. As long as the hollow screw is not securely tightened, the alignment of the housing relative to the tire valve can be adjusted so that the housing rests on the rim well, and namely on only one single location.

On the inner side of its wall lying opposite the opening, the housing may have a rib, which lies in the same plane or approximately in the same plane in which also the rotation axis of the wheel and the longitudinal axis of the tire valve lie. Such a rib has the advantage that it reinforces the wall of the housing, over which on mounting of the tire or respectively on removing of the tire from the rim the tire bead is moved. The rib provides a contribution to the solution of the problem of avoiding as far as possible damage to the device for measuring the tire pressure on mounting a tire and on removing a tire from the rim.

BRIEF DESCRIPTION OF THE DRAWINGS

Embodiments of the invention are illustrated in the enclosed drawings.

DETAILED DESCRIPTION OF THE PREFERRED EMBODIMENTS

Figure 1:
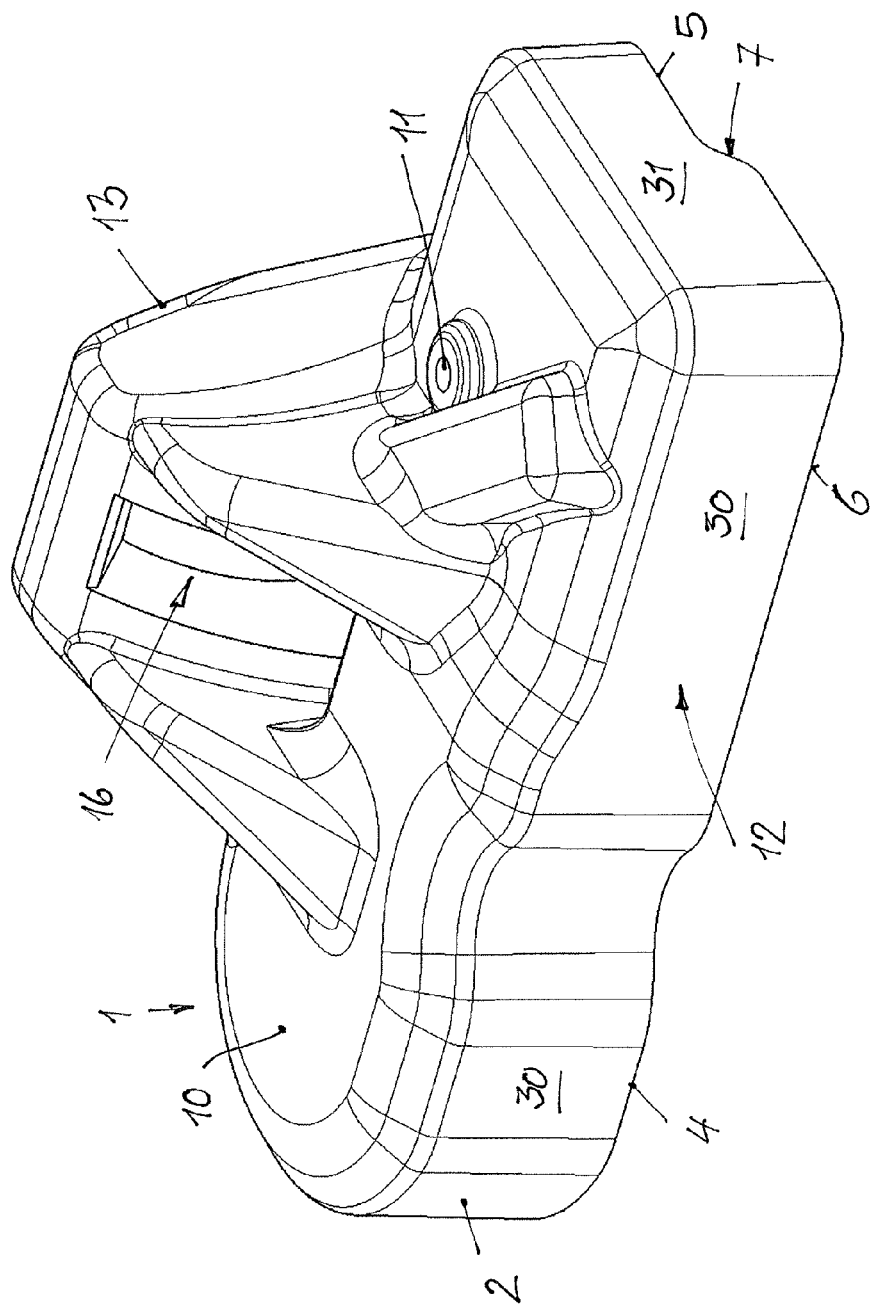
FIG. 1 shows an oblique view of the housing of a device according to the invention for measuring the tire pressure in an oblique view onto the side facing away from the rim well.

The embodiment of the invention illustrated in FIGS. 1 to 4 shows a shell-shaped housing 1, formed from a plastic, with a base part 2, which in the view illustrated in FIG. 1 is open on the underside. In the view illustrated in FIG. 2, the open underside is directed upwards with its opening 3. The opening 3 is surrounded by an edge 4, which is divided into two sections 5 and 6. Viewing FIG. 2, the edge section 5 is situated at a lower level than the edge section 6. The end face of the edge section 5 and the end face of the edge section 6 are configured so as to be flat. The two planes in which the end faces of the edge sections 5 and 6 lie are parallel to one another. Oblique faces 7 and 8 form the transition between the flat end faces of the edge sections 5 and 6. Instead of the oblique faces 7 and 8, right-angled step-shaped transitions could also be provided between the two edge sections 5 and 6.

The end faces of the two edge sections 5 and 6 do not have to be configured so as to be flat, although that is possible for the end face of the edge section 5. The end face of the edge section 6 can be constructed so as to be convex and may also be constructed so as to be concave. It is possible here that the crown of the convex edge section 6 lies in a plane. However, this is not mandatory within the sense of the present invention: The height of the edge section 6 over the plane in which the end face of the edge section 5 lies can also rise, proceeding from the oblique face 7, up to a location lying in the center of the edge section 6, at which the housing 1 after its mounting on a wheel rests on its rim well 21, and can then drop down again to the oblique face 8.

Figure 2:
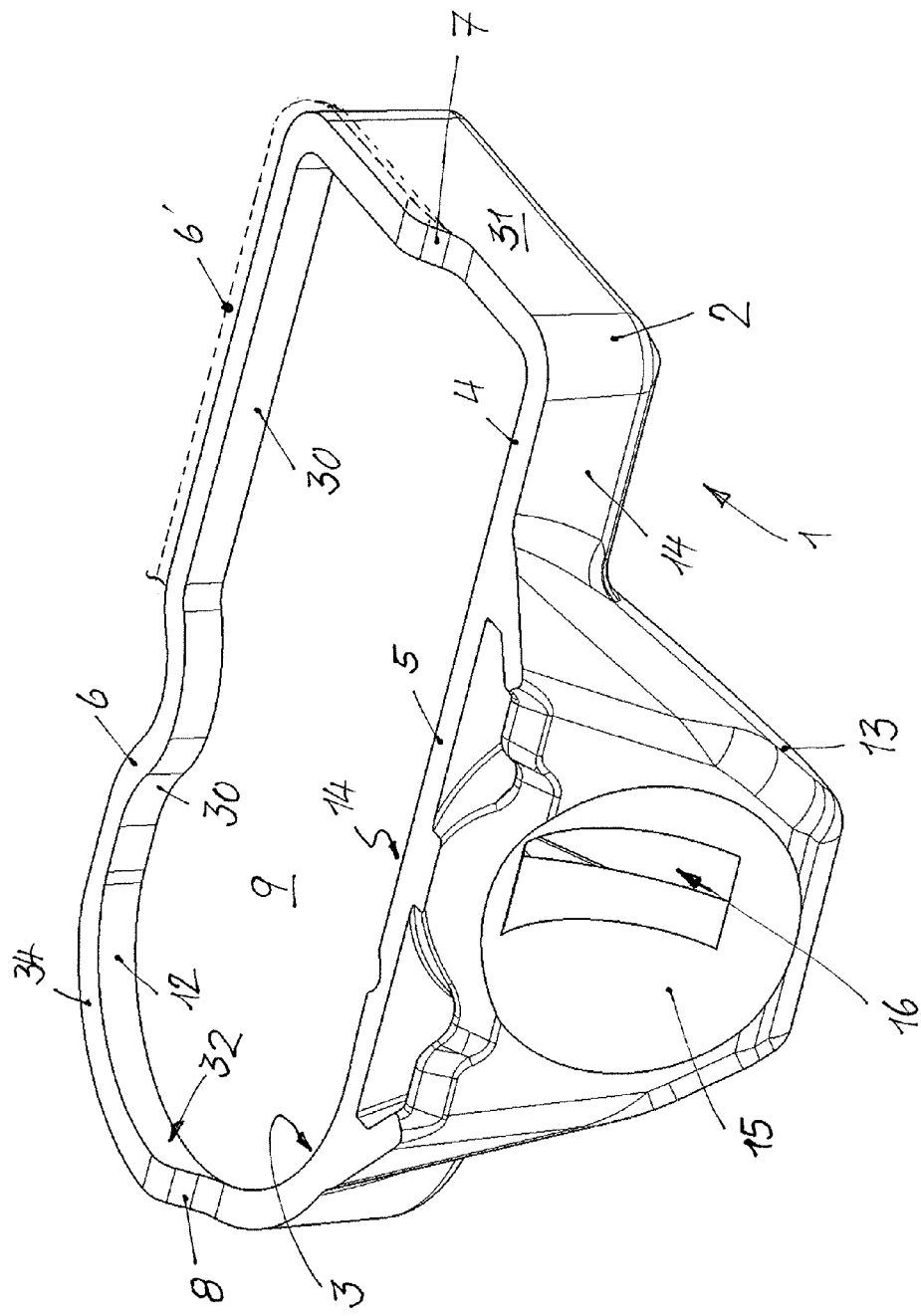
FIG. 2 shows the same housing in an oblique view onto the side of the housing facing the rim well.

The electrical components of a tire pressure monitoring device can be inserted into the housing through the opening 3. The essential components of such a tire pressure monitoring device are a pressure measuring device, a transmission device for the transmission of the pressure measurement values by radio to a receiver provided in a vehicle, a control device and a battery for the power supply or a generator which generates and temporarily stores electric current from the movement which the tire pressure monitoring device performs together with a wheel. The components of the tire pressure monitoring device are embedded into a casting compound 9, the level of which is illustrated in FIG. 2. The casting compound 9 is expediently filled into the housing 1 up to the height of the edge section 5.

In the wall 10 of the housing 1 lying opposite the opening 3 a hole 11 is provided, through which the air which is filled into the pneumatic tire has access to the pressure measuring device arranged in the housing 1.

A peripheral wall 12 of the housing 1 connects the edge 4 of the opening 3 with the wall 10 of the housing lying opposite the opening 3. The peripheral wall 12 can have the same thickness throughout. In an exemplary embodiment, however, it is constructed so as to be thickened at the edge section 6. Some length of a thickened edge section 6' is illustrated in dashed lines in FIG. 2.

Figure 3:
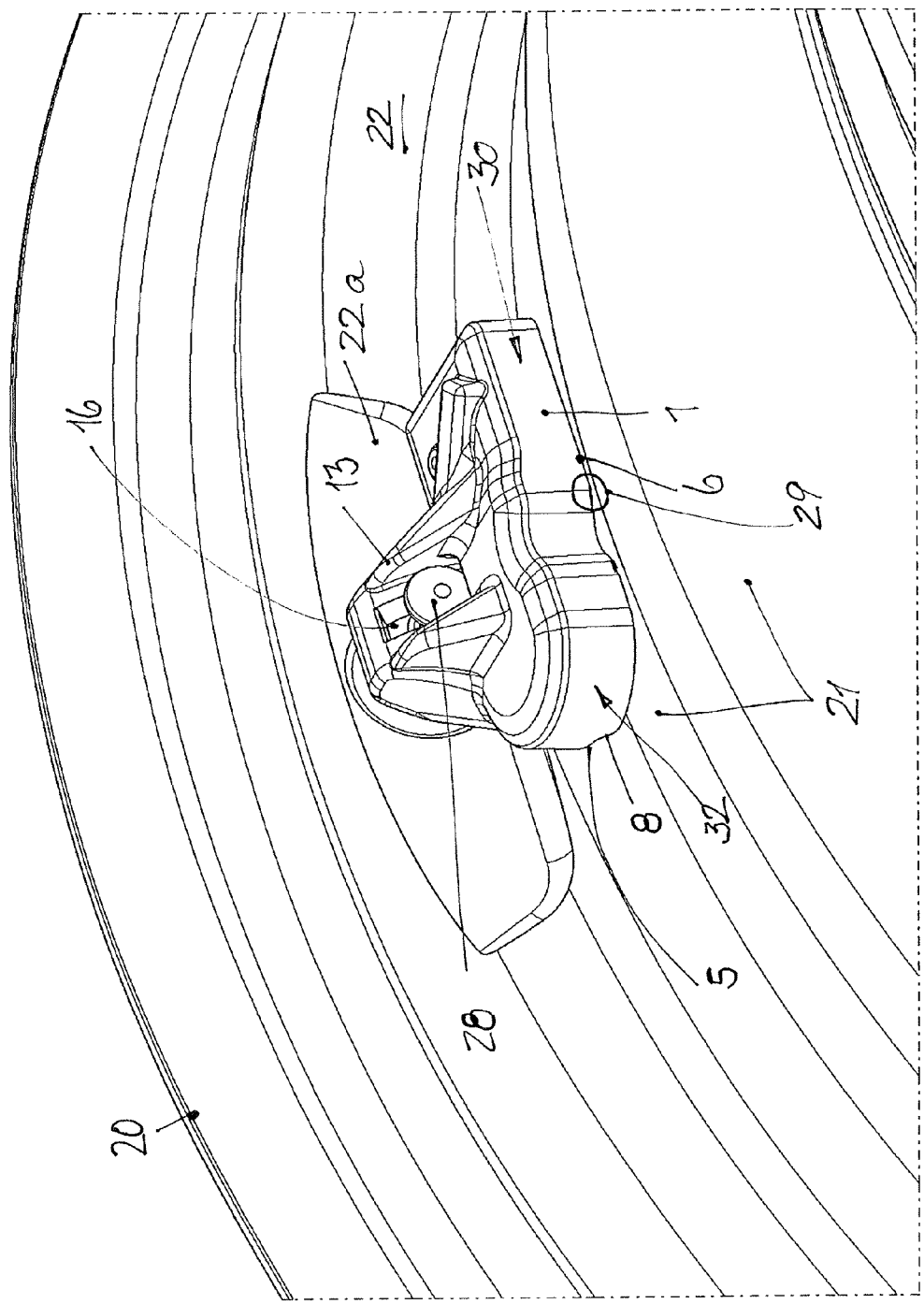
FIG. 3 shows a device for measuring the tire pressure with the housing of FIGS. 1 and 2 after the mounting on a rim, as required.
Figure 4:
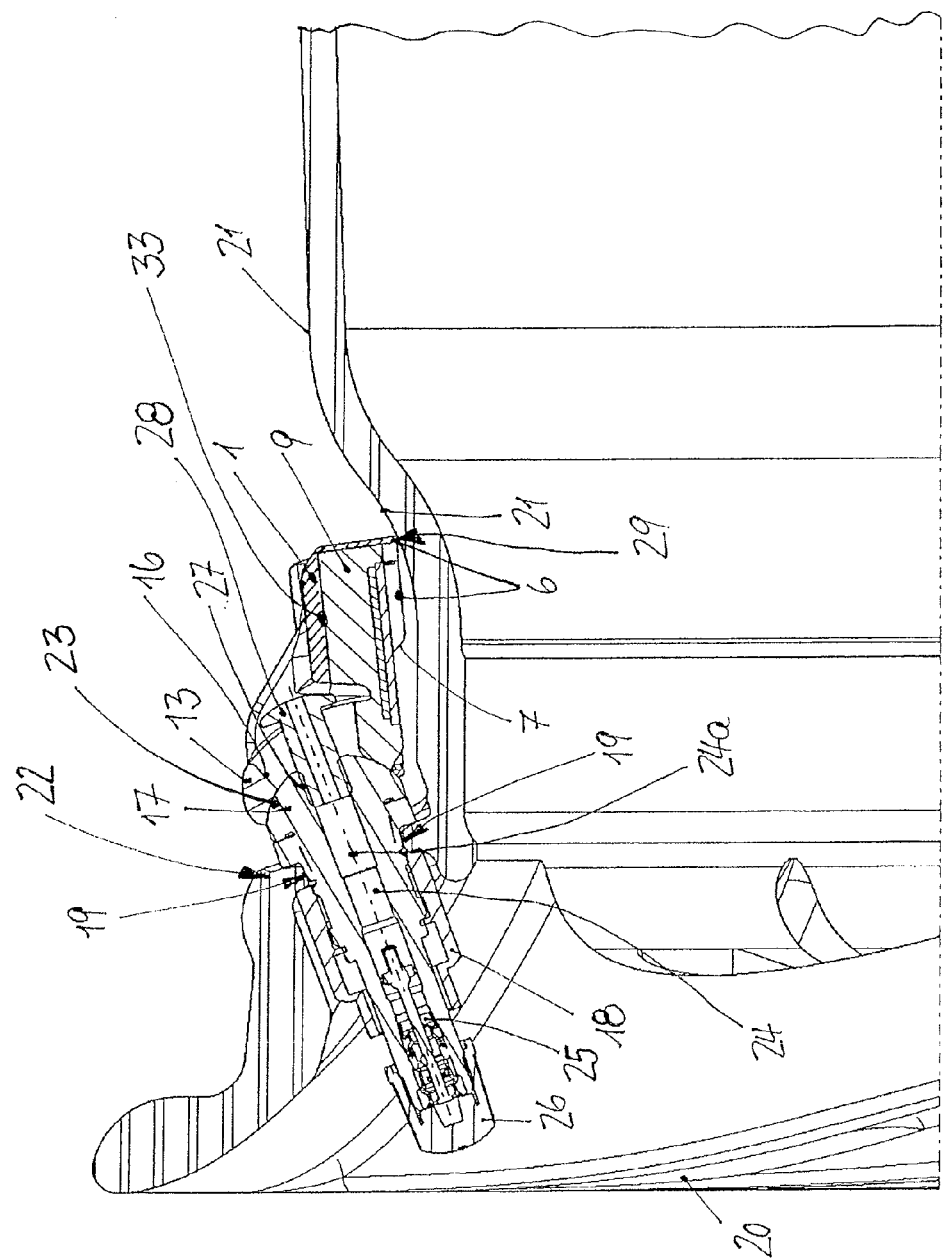
FIG. 4 shows the radial section along the section line A-A through the arrangement of FIG. 3.

An extension 13 is formed on the housing 1, which extension proceeds from the wall 10 lying opposite the opening 3 and from a longitudinal side 14 of the peripheral wall 12. The extension 13 is arranged approximately centrally on the housing 1 and rises over the wall 10. On that side of the extension 13 facing away from the longitudinal side 14, a calotte-shaped (bowl-shaped) depression 15 is provided therein, which is penetrated by a centrally arranged elongated hole 16, which hole extends lengthwise in the direction from the edge 4 to the wall 10 of the housing 1 lying opposite the opening 3 and beyond. This extension 13 serves to fasten the housing 1 on the valve base 17 of a tire valve 18, as is illustrated in FIGS. 3 and 4. The tire valve 18 is placed in a known manner in a hole 19 of a rim 20, which is a component of a wheel for a vehicle which is equipped with pneumatic tires. The rim 20 has a rim well 21 and two shoulders 22 delimiting the rim well. The hole 19 in which the tire valve 18 is placed is situated in a depression 22a of one of these shoulders 22.

As defined herein, calotte is to be understood as a bowl-shaped or cap-shaped surface having the shape of a section of a sphere. When a depression is calotte-shaped it resembles a bowl-like shape. When a protrusion or extension is calotte-shaped it resembles a cap-like shape.

The valve base 17, that is the end of the tire valve 18 lying in the wheel, is constructed so as to be convex in the present case, in particular calotte-shaped with a calotte 23, the radius of curvature of which is adapted to the radius of curvature of the calotte-shaped recess 15 in the extension 13 of the housing 1. The calotte 23 of the valve base 17 is bored through centrally. The bore is part of the longitudinal through bore 24 of the tire valve 18 in which also the conventional valve mechanism 25 is accommodated, which as usual is protected at the outer end of the tire valve 18 by a screw cap 26. A section of the longitudinal bore 24 adjoining the calotte 23 is constructed as a threaded bore 27.

The fastening of the housing 1 on the valve base 17 takes place such that the valve base 17 is introduced into the calotte-shaped depression 15 of the extension 13 of the housing 1 and from the direction of the rear side of the depression 15 a hollow screw 28 is turned in the threaded bore 27. This permits the elongated hole 16 in connection with the reciprocal engagement of the calottes of valve base 17 and housing 1 to align the housing 1 so that it comes to lie with its edge section 6, and namely only with a single location 29 of the edge section 6, on the circularly curved surface of the rim well 21, see FIG. 3. In this way, the housing, after its mounting on the rim 20, is mounted at precisely two locations, on the one hand at the valve base 17 and on the other hand at a location on the rim well 21 lying opposite the hole 19.

The wall 10 lying opposite the opening 3 is reinforced by an internal rib 33, see FIG. 4.

Figure 5:
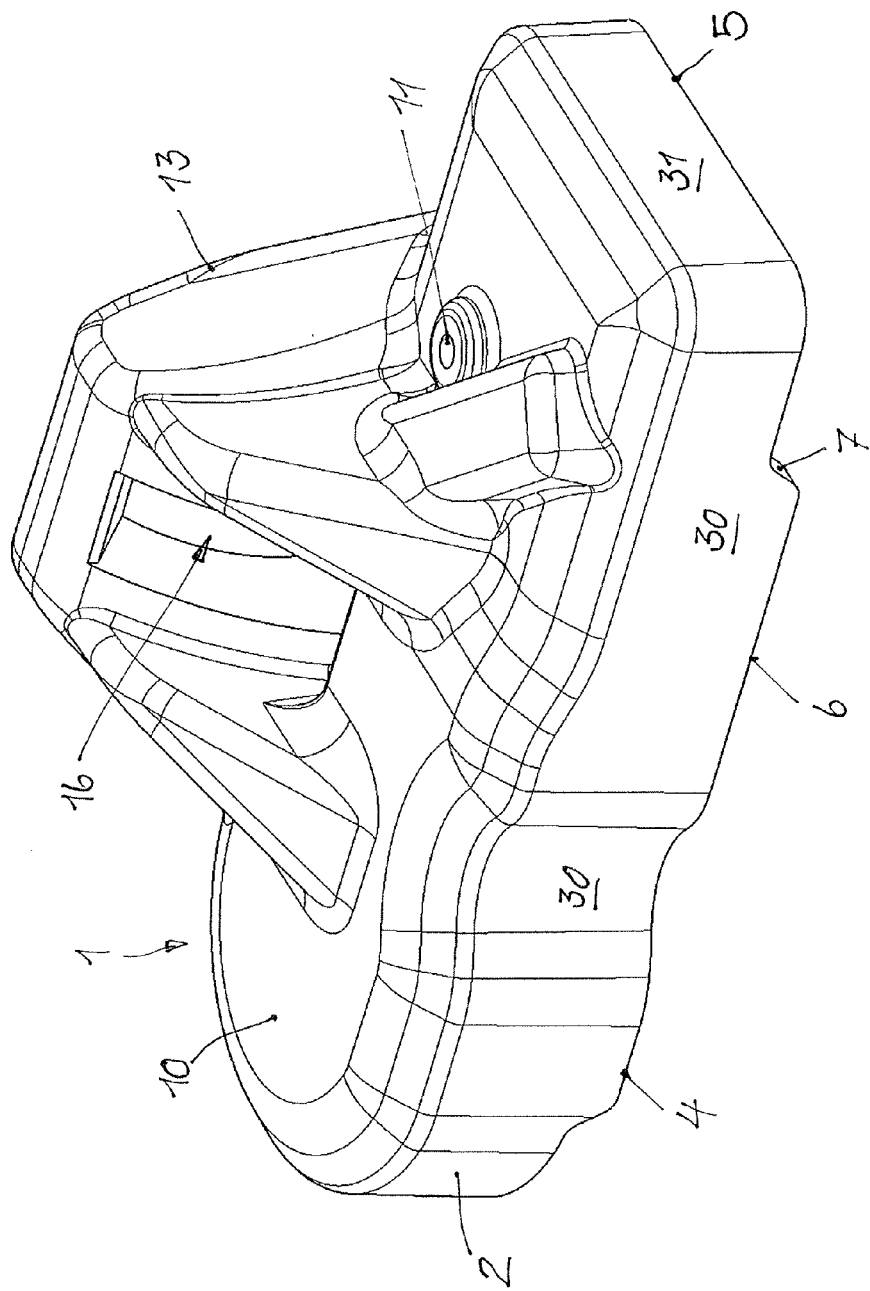
FIG. 5 shows a second embodiment of a housing in an oblique view according to FIG. 1.
Figure 6:
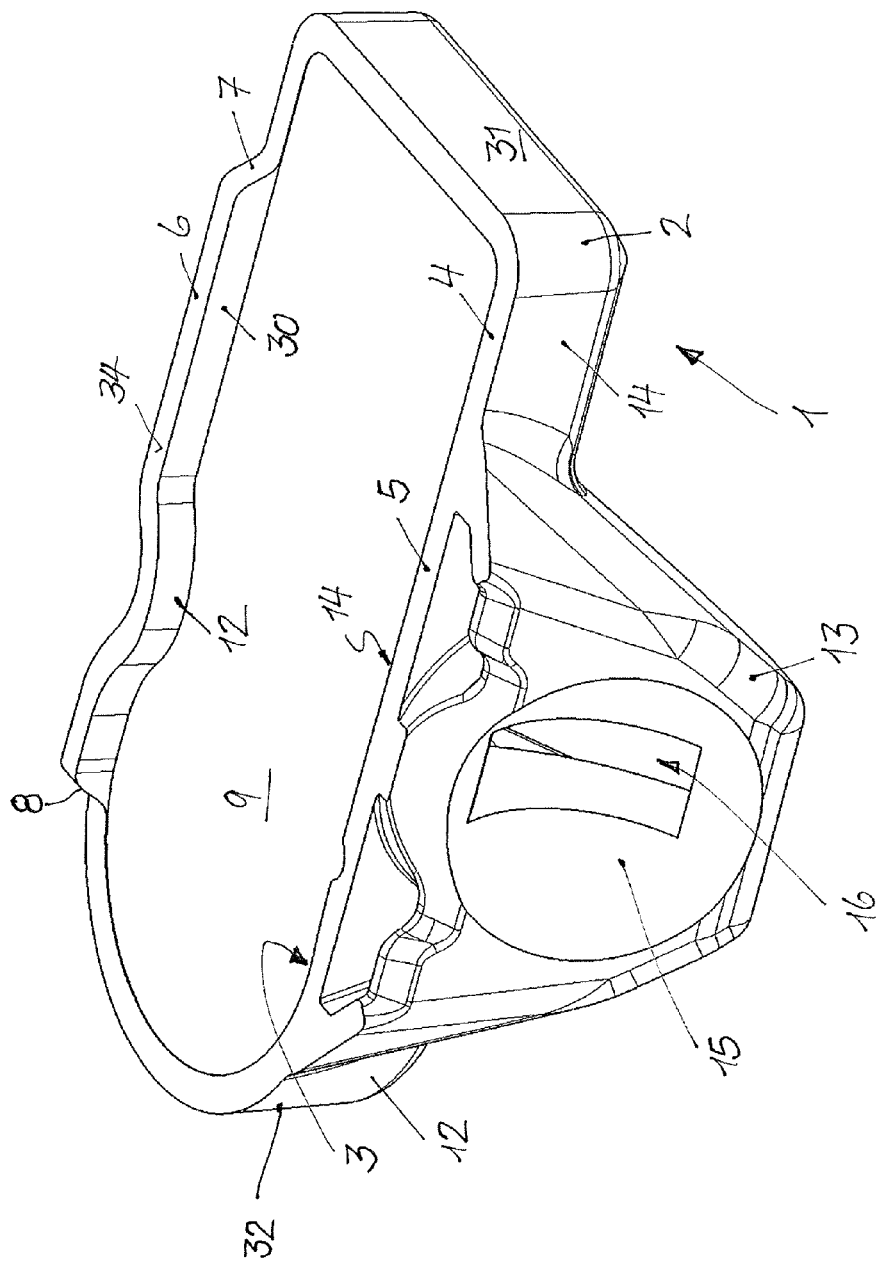
FIG. 6 shows the housing of FIG. 5 in an oblique view according to FIG. 2.
Figure 7:
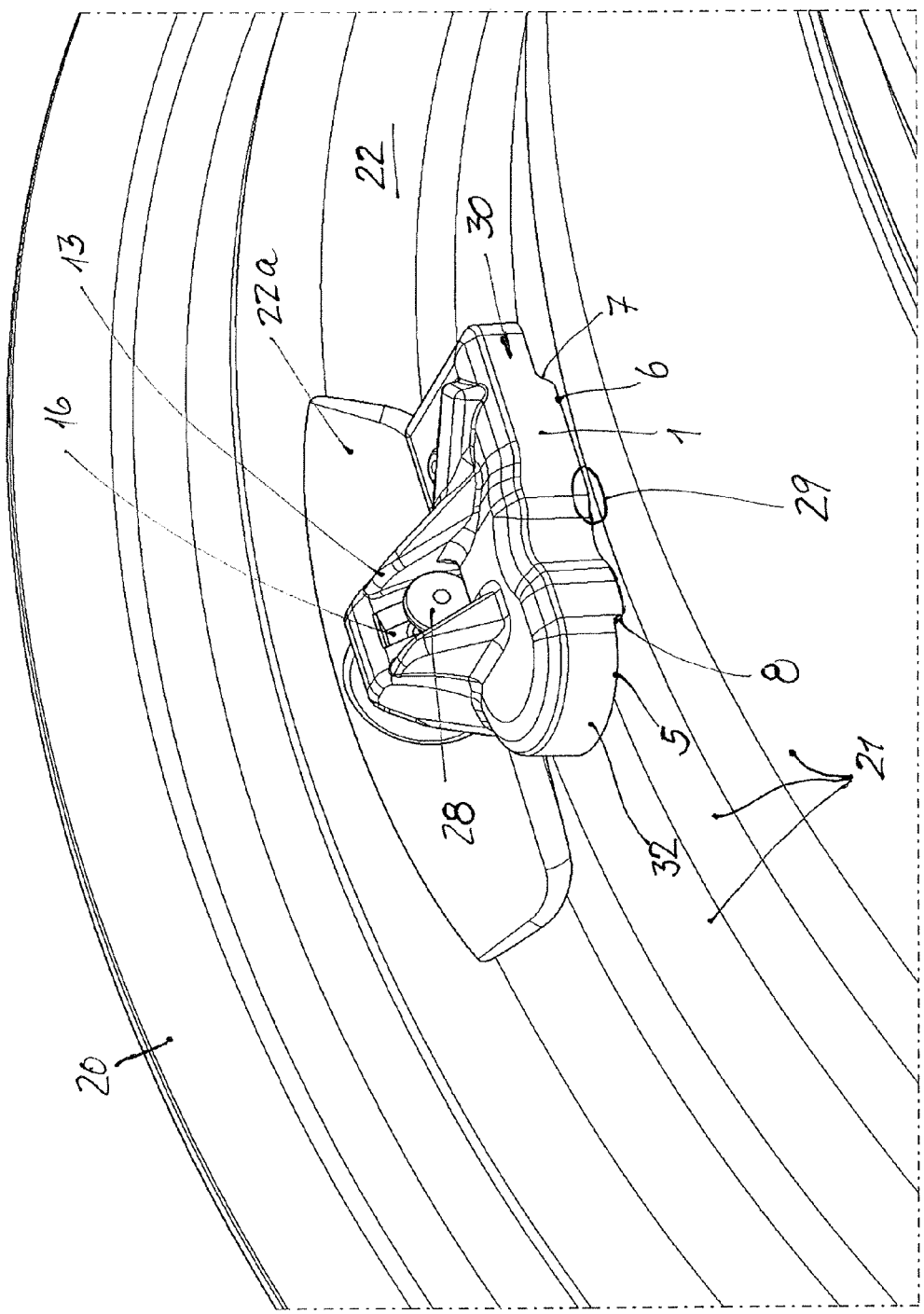
FIG. 7 shows a device for measuring the tire pressure after the conventional mounting on a rim in an illustration according to FIG. 3.
Figure 8:
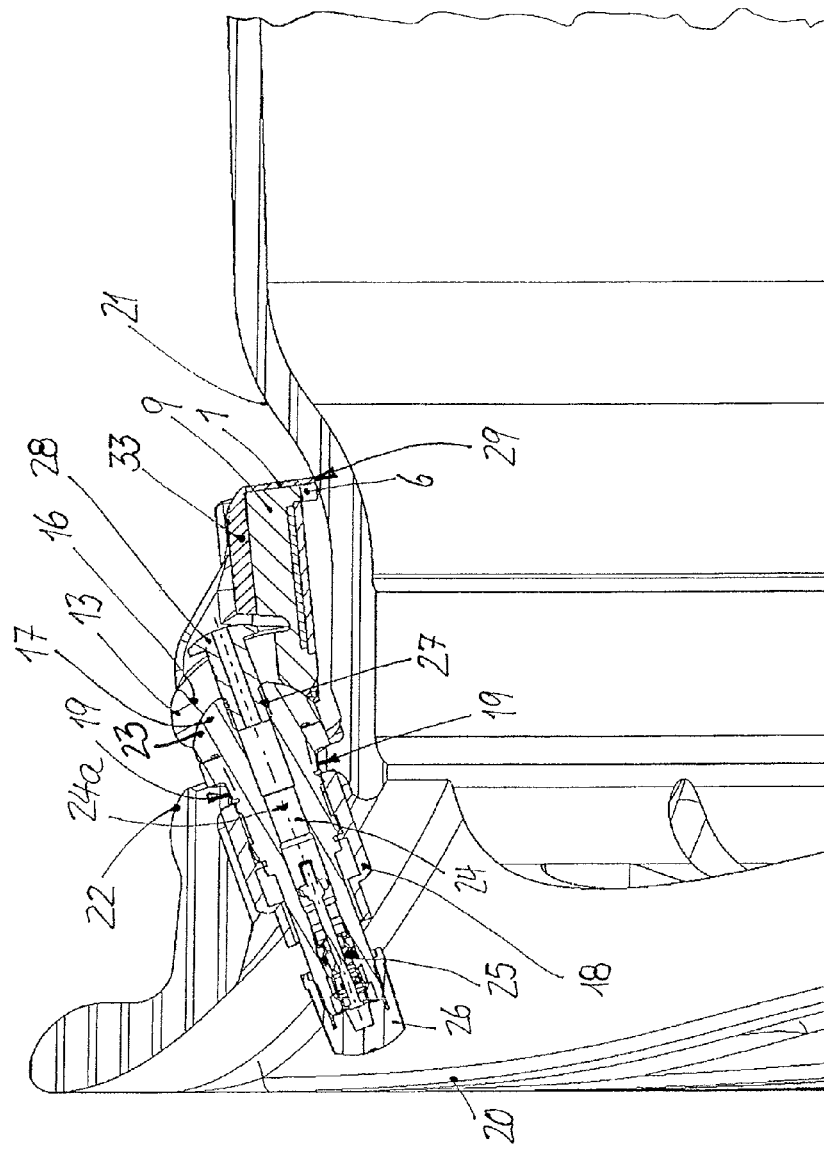
FIG. 8 shows a section along the section line B-B through the arrangement illustrated in FIG. 7.

The embodiment illustrated in FIGS. 5 and 8 conforms predominantly to the embodiment illustrated in FIGS. 1 to 4. Identical parts and parts corresponding to one another are therefore designated by the same reference numbers. The sole difference between the two embodiments consists in that in the embodiment of FIGS. 1 to 4, the edge section 6, at which the location 29 lies, with which the housing 1 rests on the rim well 21, extends over a greater length than in the embodiment according to FIGS. 5 to 8. In the embodiment of FIGS. 5 to 8, the edge section 6 extends merely over a portion of the longitudinal side 30 of the housing 1, which lies opposite the elongated hole 16. In the embodiment according to FIGS. 1 to 4, the edge section 6, on the other hand, extends further somewhat over the side walls 31 and 32, which connect the longitudinal sides 14 and 30 of the housing 1 with one another.

Figure 9:
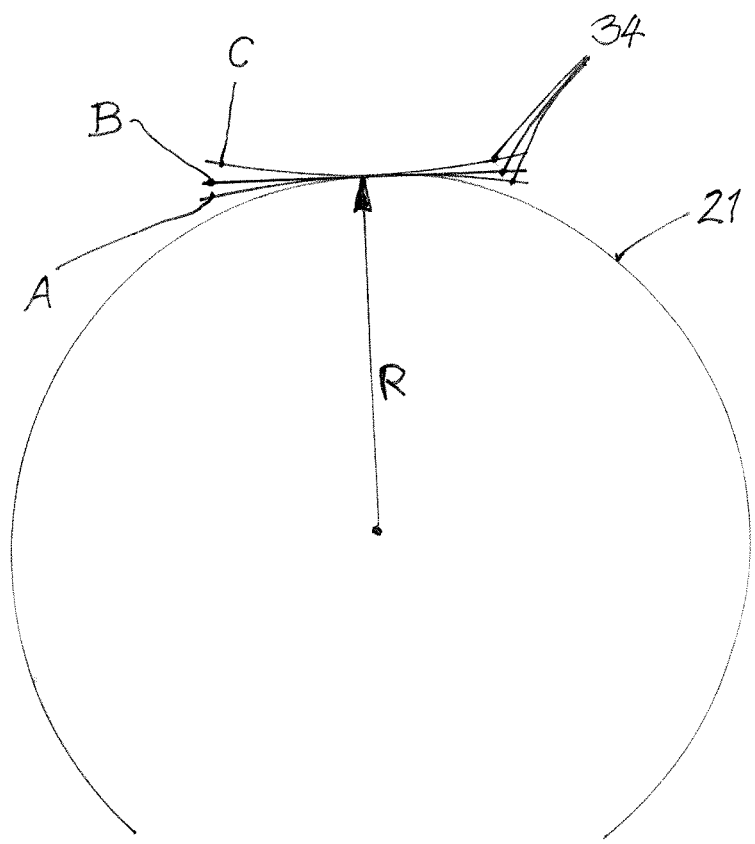
FIG. 9 is a diagrammatic illustration of possible curvatures of the edge section of the housing by which the latter rests on the rim well.

FIG. 9 shows diagrammatically a course of a rim well 21 with the radius R. The reciprocal value K of the radius R, $K=1/R$ is a measure for the curvature of the rim well 21.

The housing of the device for measuring the tire pressure will rest with only a single location of its edge section 6 on the rim well 21: (a) when the end face 34 of the edge section 6 facing the rim well 21 has a smaller curvature than the curvature of the rim well 21 and the curvature of the end face 34 has the same sign as the curvature of the rim well 21, then the radius of curvature of the end face 34 of the edge section 6 is greater than R (see curve A in FIG. 9); or (b) when the end face 34 of the edge section 6 is flat (see curve B in FIG.

9); or (c) when the end face 34 of the edge section 6 has a curvature, the sign of which is opposed (opposite) to the curvature of curve A.

LIST OF REFERENCE NUMBERS 1 housing
2 base part
3 opening
4 edge
5 edge section
6 edge section
6' thickened edge section
7 oblique face
8 oblique face
9 casting compound
10 wall
11 hole
12 peripheral wall
13 extension
14 longitudinal side
15 calotte-shaped depression
16 elongated hole
17 valve base
18 tire valve
19 hole
20 rim
21 rim well
22 shoulders
22a depression in a shoulder
23 calotte
24 longitudinal bore
24a longitudinal axis of tire valve
25 valve mechanism
26 screw cap
27 threaded bore
28 hollow screw
29 location
30 longitudinal side
31 side wall
32 side wall
33 rib
34 end face of the edge section 6, it faces the rim well
A curve
B curve
C curve
R radius of the rim well

What is claimed is:

1. A wheel with a device for measuring a tire pressure in a pneumatic tire of a vehicle, where the device is accommodated in a shell-shaped housing which is positioned at a valve base of a tire valve, which after mounting the housing on the wheel lies in an interior between the pneumatic tire and a rim of the wheel carrying it, which rim has a rim well and two shoulders delimiting it, one shoulder of which has a hole in which the tire valve is inserted, at which tire valve the housing is arranged so that the housing rests on the rim well, wherein there is only a single location on the housing by which the housing rests on the rim well, and this single location is situated at a section of an edge of the housing facing away from the hole, which edge also delimits a peripheral wall of the housing and an opening to an interior of the shell-shaped housing, wherein the peripheral wall has two longitudinal sides and two side walls connecting the longitudinal sides with one another, and the edge of the housing is divided into two edge sections, namely into a first edge section, at which the single location is situated, by which the housing rests on the rim well, and into a second edge section, beyond which the first edge section projects, wherein the projecting first edge section extends over the longitudinal side facing away from the hole and extends a portion further over the side walls of the housing.

2. The wheel according to claim 1, wherein this single location is situated on the section of the edge, a surface of which, facing the rim well, has a surface curvature with a curvature center point aligned with a rotation axis of the wheel, which surface curvature is smaller than a curvature of the rim well.

3. The wheel according to claim 1, wherein the section of the edge of the housing, which rests on the rim well, lies on both sides of a plane in which both a rotation axis of the wheel and also a longitudinal axis of the tire valve lies.

4. The wheel according to claim 1, wherein a surface of the single location at the section of the edge facing and resting on the rim well is not curved in circumferential direction of the edge.

5. The wheel according to claim 4, wherein the surface of the single location at the section of the edge facing and resting on the rim well which is not curved in circumferential direction of the edge extends over no more than two thirds of a length of the edge.

6. The wheel according to claim 5, wherein the device for measuring the tire pressure is embedded into a casting compound which is filled into the interior of the housing.

7. The wheel according to claim 4, wherein the surface of the single location at the section of the edge facing and resting on the rim well which is not curved in circumferential direction of the edge extends over no more than half a length of the edge.

8. The wheel according to claim 1, wherein the single location at the section of the edge resting on the rim well has a greater wall thickness than a wall section of the housing adjacent to the section of the edge.

9. The wheel according to claim 1, wherein the single location at the section of the edge resting on the rim well is rounded in section transversely to the edge.

10. The wheel according to claim 1, wherein the single location at the section of the edge resting on the rim well comprises a friction-reducing coating.

11. The wheel according to claim 1, wherein the housing is arranged adjustably on the tire valve where an inclination of the housing is changeable with respect to a longitudinal axis of the tire valve.

12. The wheel according to claim 1, wherein the housing has a rib disposed in the interior of the housing on an interior wall of the housing, where the interior wall is opposite the opening of the housing, where the rib lies in or approximately in the same plane in which a rotation axis of the wheel and a longitudinal axis of the tire valve also lie.

13. A device for measuring a tire pressure in a wheel of a vehicle provided with a pneumatic tire, wherein the device is accommodated in a shell-shaped housing which is arranged at a valve base of a tire valve, the tire valve disposed through a hole in a rim of the wheel; wherein there is only a single location on the housing by which the housing can rest on a rim well of the rim of the wheel, and this single location is situated at a section of an edge of the housing facing away from the valve base, where the edge delimits a peripheral wall of the housing and an opening to an interior of the shell-shaped housing, wherein the peripheral wall has two longitudinal sides and two side walls connecting the longitudinal sides with one another, and the edge of the housing is divided into two edge sections, namely into a first edge section at which the single location is situated and by which the housing can rest on the rim well, and into a second edge section beyond which the first edge section projects, wherein the projecting first edge section extends over the longitudinal side facing away from the hole and extends further over the side walls of the housing.

\* \* \* \* \*